United States Patent [19]
Schulz

[11] Patent Number: 5,273,664
[45] Date of Patent: Dec. 28, 1993

[54] APPARATUS AND METHOD FOR DISINFECTION OF WATER BY OZONE INJECTION

[76] Inventor: Christopher R. Schulz, 4900 Magdalene Ct., Annandale, Va. 22003

[21] Appl. No.: 996,823

[22] Filed: Dec. 28, 1992

Related U.S. Application Data

[63] Continuation-in-part of Ser. No. 774,360, Oct. 10, 1991, abandoned.

[51] Int. Cl.[5] ............................................. C02F 1/72
[52] U.S. Cl. .................................. 210/759; 210/192; 210/199; 210/220; 210/760
[58] Field of Search ............... 210/759, 760, 143, 192, 210/199, 220

[56] References Cited

U.S. PATENT DOCUMENTS

| | | | |
|---|---|---|---|
| 2,380,465 | 7/1945 | Proudman | 210/199 |
| 4,680,111 | 7/1987 | Ueda | 210/199 X |
| 5,110,459 | 5/1992 | Baxter | 210/220 X |

*Primary Examiner*—Charles Hart
*Attorney, Agent, or Firm*—Nies, Kurz, Bergert & Tamburro

[57] ABSTRACT

Apparatus and a method for disinfecting water by contacting the water with gaseous ozone. The device includes a series of treatment chambers that are interconnected serially by external transfer conduits, each transfer conduit including an introduction tap for introducing ozonated water into the water to be treated. The treated water flows sequentially from one chamber into the next. Hydrogen peroxide is added to the water as it enters a final chamber for final degasification of the water. Within each treatment chamber a mixing chamber is provided for additional intermixing and greater mass transfer of ozone with the water by alternately speeding up and slowing down the flow of the ozone-water mixture before the mixture is introduced downwardly into the respective chamber adjacent the lower wall thereof. An eductor and static mixer are provided to entrain and mix ozone and water to provide a sidestream of ozonated water for each of the several treatment chamber transfer conduits, and flow control valves are provided to permit regulation of the rate of flow of ozonated water for maximum desired disinfection. In another embodiment, direct diffusion of ozone into water flowing within the transfer conduits is effected by passing the ozone into ceramic, rod-type diffuser elements positioned within the conduits.

35 Claims, 8 Drawing Sheets

APPARATUS AND METHOD FOR DISINFECTION OF WATER BY OZONE INJECTION

CROSS-REFERENCE TO RELATED APPLICATION

This application is a continuation-in-part of copending application Ser. No. 07/774,360, filed Oct. 10, 1991 abandoned.

BACKGROUND OF THE INVENTION

1. Field of the Invention

The present invention relates to an apparatus and a method for disinfecting water by the direct injection of gaseous ozone into the water. More particularly, the present invention relates to a water treatment apparatus and a method in which gaseous ozone is injected into an auxiliary feedstream of water, which is then introduced at several spaced and distinct points in the flow path of the water to be treated, in order to provide sequential and multiple exposures to ozone of the water to be treated.

2. Description of the Related Art

The notion of treating water with gaseous ozone for disinfection is well known. Various types of apparatus and methods have been devised to dissolve gaseous ozone into water for treatment of the water by providing retention chambers in which the ozone is introduced through mechanical mixers, injectors, porous diffusers, and packed columns. The primary purpose of each of those approaches is to transfer sufficient gaseous ozone to the water to be treated, in order to provide as large as possible contact of the water with the ozone so that the disinfection treatment is as thorough as possible.

Although there are several known approaches to accomplish the disinfection operation, even the more efficient of those processes, in terms of the efficiency of exposure of the water to ozone, include certain drawbacks. For example, although packed column technology provides transfer efficiencies of from about 80% to about 95%, there is little operational experience with such approaches, and, more significantly, there is a strong potential for high head losses as the result of build-up of scale on the column medium.

Mechanical mixing, on the other hand, although capable of providing ozone transfer rates in the range of from about 90% to about 98%, involves short contact times that might require retreatment, and also involves high operating cost because of the energy and maintenance requirements.

Bubble diffuser contactors are quite widely used, and provide ozone transfer efficiencies in the range of about 85% to about 95%. However, very large contact vessels are required, to accommodate the diffuser layout, and diffuser plugging is a common problem. The uniform distribution of gaseous ozone across the diffuser grid of the contactor is also a problem at low gas flow rates, sometimes resulting in inadequate disinfection of the water being treated.

Direct injection of ozone has distinct advantages in terms of low energy and maintenance costs, but heretofore ozone transfer efficiencies were only on the order of about 70%.

It is an object of the present invention to overcome the deficiencies in the previously-employed apparatus and methods.

It is a further object of the present invention to provide a water treatment apparatus and method utilizing direct injection of ozone and that results in improved ozone transfer efficiency.

It is another object of the present invention to provide an apparatus and method for direct injection of ozone in combination with multiple contact chambers that can be used for providing primary disinfection of potable water to meet surface water treatment regulations issued by the United States Environmental Protection Agency.

SUMMARY OF THE INVENTION

Briefly stated, in accordance with one aspect of the present invention, apparatus is provided for treating water with ozone for providing improved and efficient disinfection. The apparatus includes a closed water treatment vessel that includes an interior portion for receiving water to be treated, and a water inlet conduit for conveying into the interior of the vessel water to be treated, and a water outlet conduit for conveying treated water from the treatment vessel. A source of ozone is provided for direct injection into a sidestream water flow conduit, and that sidestream flow is subsequently introduced directly into the main water flow stream flowing within inlet conduit to the treatment vessel. A venturi-type mixing chamber is provided within the treatment vessel for blending the ozone sidestream with the main flow of water and thereby allow further absorption of gaseous ozone into the water. The venturi-type mixing chamber is positioned within the treatment vessel and has a mixing chamber inlet in communication with the water inlet conduit, and has a mixing chamber outlet adjacent a lower portion of the treatment vessel to cause ozone-containing water to flow into the lower portion of the treatment vessel, whereby a contact period is provided for the ozone to react with contaminants in the water to be treated, as the ozone-containing water flows upwardly in the treatment vessel. The mixing chamber includes a converging channel and a diverging channel through which the water to be treated passes, to alternately accelerate and decelerate the water flow for improved mixing with and absorption of ozone into the water. The water outlet conduit from the treatment vessel is submerged below the level of water contained within the vessel for withdrawal of ozone-treated water.

In accordance with another aspect of the present invention a series of treatment vessels are provided for sequential treatment of water to be disinfected, with the additional injection of ozone into the water as it travels from one vessel into the next. This arrangement provides an efficient method of disinfecting potable water, providing plug-flow-type hydraulic characteristics, precise contact times, and high ozone transfer efficiencies.

In accordance with a still further aspect of the present invention a final treatment is provided and in which the incoming water has hydrogen peroxide injected for scavenging any free ozone from the water.

DESCRIPTION OF THE PREFERRED EMBODIMENTS

Figures 1, 2, 3, 7:
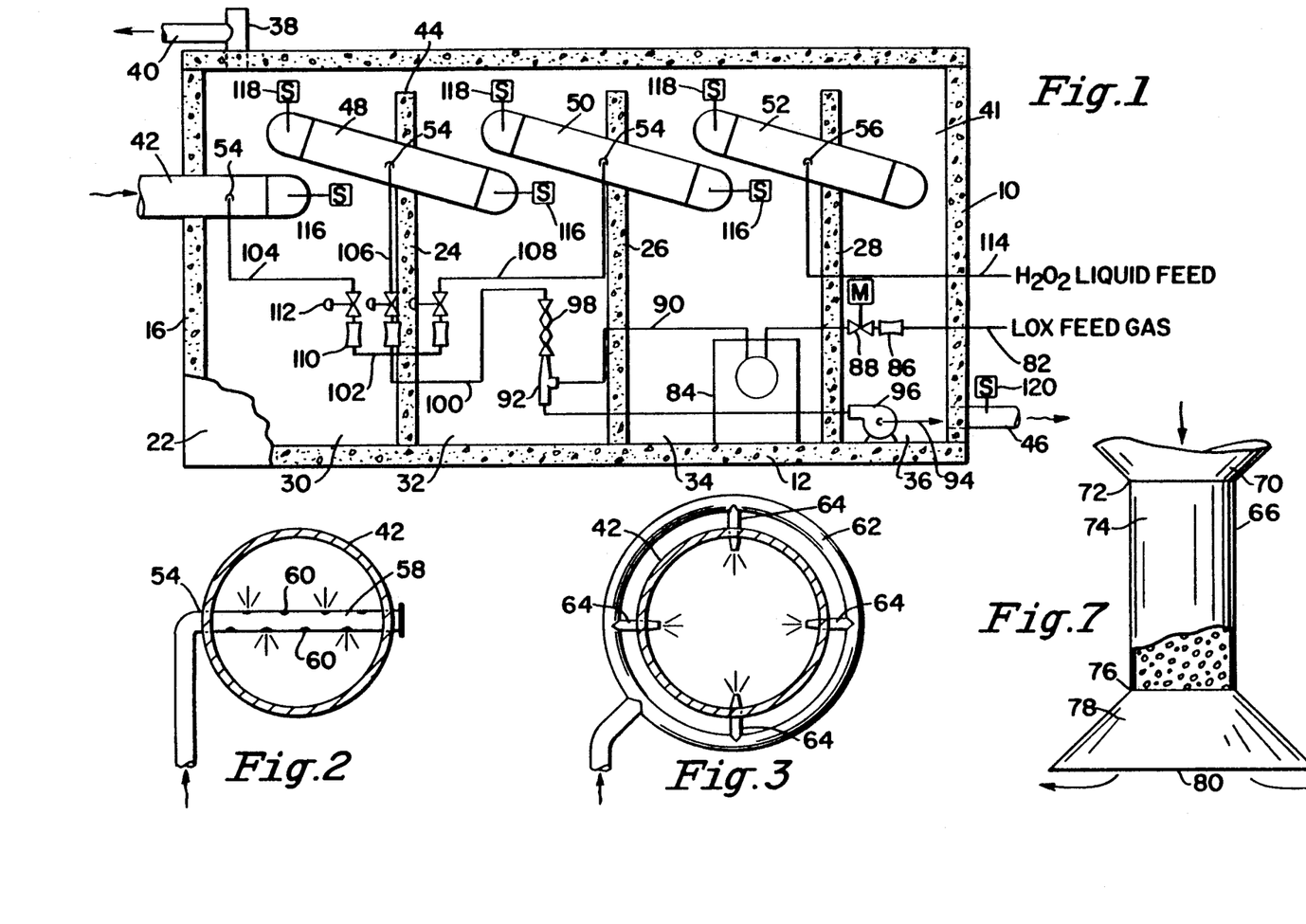
FIG. 1 is a side elevational view, partially broken away, showing ozone injection water treatment apparatus in accordance with the present invention.
FIG. 2 is a fragmentary cross-sectional view of a water conduit showing one form of structural arrangement for direct injection of ozone into water flowing through the conduit.
FIG. 3 is a fragmentary cross-sectional view similar to that of FIG. 2, but showing a second form of structural arrangement for direct injection of ozone apparatus.
FIG. 7 is an enlarged, fragmentary, elevational view, partially broken away, of the lower portion of one of the drop conduits within the water treatment apparatus in accordance with the present invention.
Figure 4:
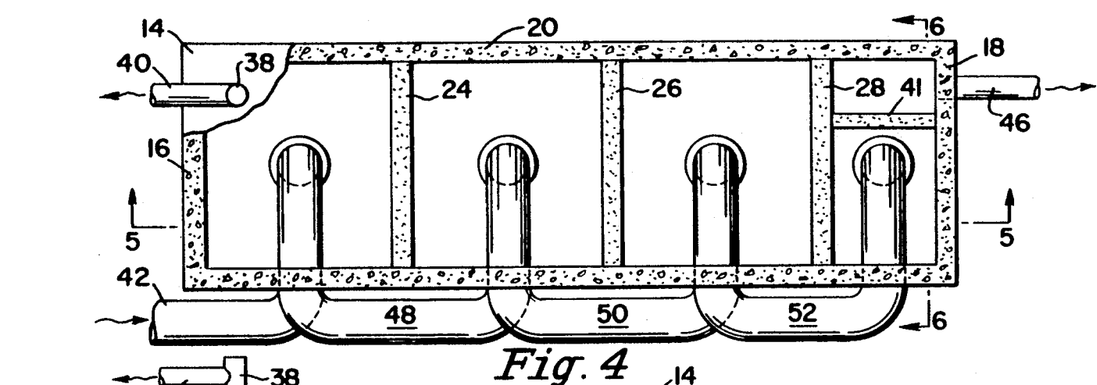
FIG. 4 is a top plan view, partially broken away, of the apparatus shown in FIG. 1.
Figure 5:
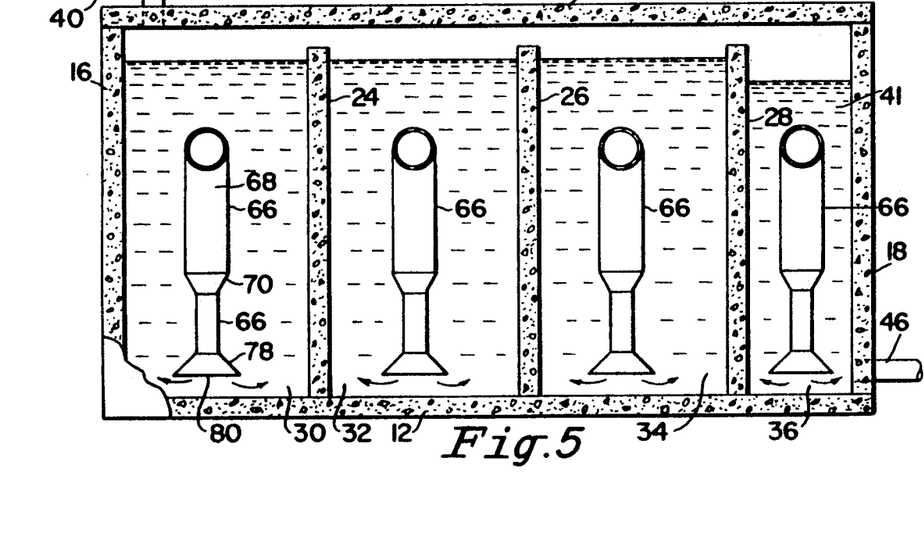
FIG. 5 is a longitudinal cross-sectional view taken along the line 5—5 of FIG. 4.

Referring now to the drawings, and particularly to FIG. 1 thereof, there is shown a water treatment system including a closed ozone contactor vessel 10 that is of generally rectangular cross section, both longitudinally and transversely. Vessel 10 can be made from concrete and includes a bottom wall 12, a top wall 14, a pair of opposed end walls, 16, 18 and a pair of opposed side walls 20, 22 (see FIG. 4). Several transversely extending chamber separator walls 24, 26, and 28 divide vessel 10 into four generally rectangular treatment chambers 30, 32, 34, and 36. Three such chambers 30, 32, and 34 are each of substantially equal volume as shown in FIGS. 1, 4, and 5. Additionally, and as best seen in FIGS. 1 and 5, separator walls 24, 26, and 28 extend upwardly from bottom wall 12 of vessel 10 but terminate short of top wall 14, to thereby provide a unitary upper area within vessel 10 to permit collection of free ozone and other gases for venting through a vent conduit 38 that extends through upper wall 14 and that communicates with a gas treatment system (not shown) through conduit 40. Although the present description is based upon a total of four treatment chambers, it will be appreciated that the actual number of chambers can be different, and will depend upon the flow rates and contact times necessary to achieve disinfection. Further, although chambers 30, 32, and 34 are illustrated and described as having the same volume, it is not essential that that volumetric relationship be maintained, and it may be desirable in some instances to use larger chamber volumes in the downstream stages of disinfection to allow additional contact time for disinfection after the initial ozone demand of the water is satisfied in the first stage.

As also seen in FIGS. 1, 4, and 5, end chamber 36 is separated from chamber 34 by separator wall 28 that extends upwardly from bottom wall 12 of vessel 10 to a short distance below top wall 14 to define a reaction chamber for treatment of water within chamber 36 with hydrogen peroxide to chemically remove any ozone residual from the water, as will be hereinafter explained. As shown in the drawing figures, the interior volume of reaction chamber 36 can be substantially less than that of any of ozone treatment chambers 30, 32, and 34, because chamber 36 is not used for providing contact time for disinfection.

As an additional or an alternative degassing arrangement, a weir 41 can be provided to span the width or length of the last chamber, so the water flows over the weir to create sufficient turbulence to cause release of the ozone from the water. Such a weir would also determine the water level in the upstream chambers.

Contactor vessel 10 includes an inlet conduit 42 for conveying the water to be treated into the interior of the vessel. Inlet conduit 42 is so positioned that it introduces untreated water into chamber 30 at an elevation that is below the top surface 44 of chamber separator wall 24, so that the untreated water enters chamber 30 through a submerged inlet.

Contactor vessel 10 includes an outlet conduit 46 that extends from degasification chamber 36 and also is so positioned that it is submerged with respect to water in that treatment chamber.

Positioned between and interconnecting adjacent treatment chambers 30 and 32, chambers 32 and 34, and chambers 34 and 36 are a plurality of transfer conduits 48, 50, and 52, respectively, each of which is arranged to transfer water from one chamber into the next adjacent downstream chamber for subsequent treatment. As shown in FIG. 1, each of transfer conduits 48, 50, and 52 is inclined relative to the horizontal, so that their respective inlet ends are at a higher elevation, relative to bottom wall 12, than are their respective outlet ends, thereby providing an efficient piping arrangement that allows the outlet pipe to be placed near the top of one chamber with the inlet pipe directly below it, so that the entire depth of the contactor chamber can be used for ozone contacting. As more clearly seen in FIG. 4, transfer conduits 48, 50, and 52 extend externally of and along side wall 22 of contactor vessel 10, as also do inlet conduit 42 and outlet conduit 46.

Referring once again to FIG. 4, each of inlet conduit 42 and transfer conduits 48 and 50 include injection taps 54 to permit the injection into the respective conduits of an ozone-water mixture. Similarly, transfer conduit 52 includes injection tap 56 to permit the injection into conduit 52 of liquid hydrogen peroxide. The respective injection taps enable substantially uniform introduction into the fluid flowing within the respective conduits of ozonated water.

As shown in FIG. 2, the respective injection taps 54 and 56 can take the form of a transversely positioned injection conduit 58 extending through the wall of the associated inlet or transfer conduit. Injection conduit 58 includes a plurality of spaced apertures 60 positioned around and along the respective injection conduit to permit substantially uniform injection of ozonated water interiorly of inlet conduit 42 and transfer conduits 48 and 50, and into the flowing stream within the respective conduits.

Another embodiment of an ozonated water injector is shown in FIG. 3, in which a circular distribution conduit 62 surrounds the respective flow conduit and includes four equally spaced, radially extending injection tubes 64 that each pass through the side wall of the respective flow conduit for radially inwardly injecting ozonated water.

Similar injection tap structures can be employed to inject hydrogen peroxide into transfer conduit 56.

Figure 6:
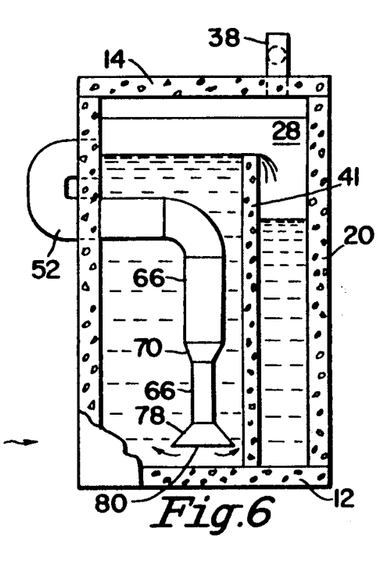
FIG. 6 is a transverse cross-sectional view taken along the line 6—6 of FIG. 4.

Referring now to FIGS. 5 and 6, positioned interiorly of each of chambers 30, 32, 34, and 36, and extending in a generally vertical direction, is a drop conduit 66 that receives ozonated water, either from inlet conduit 42 for the case of chamber 30, or from one of transfer conduits 48, 50, and 52 in the case of chambers 32, 34, and 36. In endmost chamber 36 drop conduit 66 receives ozonated water from chamber 34, into which hydrogen peroxide has been injected through injection tap 56.

Each of drop conduits 66 can be of circular cross section, as shown, and preferably has the same cross-sectional area as that of the respective transfer pipe with which it communicates. Drop conduits 66 include an elongated, constant area section 68, immediately below which are respective converging sections 70 that have an inlet area corresponding with that of the constant area section.

As best seen in FIG. 7, extending from the outlet 72 of converging section 70 is a constant area mixing section 74. Connected to the outlet 76 of mixing section 74 is a diverging section 78 that has an inlet area corresponding with the cross-sectional area of mixing section 74.

As shown in FIGS. 5 and 6, outlet 80 of diverging section 78 is positioned so that it opens toward and is adjacent to but spaced from bottom wall 12 of contacting chamber 10.

Referring once again to FIG. 1, the injection arrangement for injecting ozonated water into the system at each of injection points 54 includes a source of liquid oxygen (not shown) that provides liquid oxygen through a liquid oxygen conduit 82 to a liquid-oxygen-based ozone generator 84 (for example, an ozone generator identified under the trade name MEGOS, manufactured by Schmidding, Inc. of Germany). Liquid oxygen conduit 82 preferably includes a flow meter 86 and a motor-operated flow control valve 88 to permit monitoring and control of the liquid oxygen flow rate. An outlet conduit 90 from ozone generator 84 communicates with an eductor 92 in which the ozone from ozone generator 84 is pulled into eductor 92 by the differential pressure created in the eductor and is initially mixed with water to provide a sidestream or feedstream of ozonated water. In that regard, the use of liquid oxygen results in high ozone concentrations of from about 6% to about 12%, which reduces the required sidestream flow rate, improves ozone mass transfer, and provides a simpler system, both mechanically and operationally, and at a lower cost than an air-based gas system.

Treated water is provided to a unitary eductor 92 through water feed conduit 94 that communicates with contactor water outlet conduit 46. A booster pump 96 is provided in conduit 94 to increase the pressure of the treated feed water so that a higher velocity flow of water occurs in eductor 92, in order to more strongly induce the flow into eductor 92 of ozone gas from ozone generator 84. Although a plurality of eductors can be employed, one for each injection stream, a higher overall sidestream water flow rate would be required, and therefore a single eductor (or a pair of eductors for higher sidestream flow rates) is preferred to promote simplicity of the system.

Positioned downstream of eductor 92 is a static mixer 98 which imparts to the sidestream and generates a large number of very small ozone bubbles to provide a high gas-to-liquid volumetric ratio, and thereby high mass transfer rates and a near-saturated ozone solution. A suitable static mixer can be a standard mixer such as those manufactured by Koch Engineering Company, Inc., of Wichita, Kans. Ozone mass transfer rates of from about 95% to about 99% can be achieved by using an eductor in combination with a static mixer.

From static mixer 98 the ozonated water is conveyed through conduit 100 to a flow distribution manifold 102 that includes three outlet conduits 104, 106, and 108, each of which outlet conduits includes a flow meter 110 and a flow control valve 112 for regulating the rate of flow of the ozonated sidestream water into inlet conduit 42 and into transfer conduits 48 and 50 through respective injection taps 54.

As also seen in FIG. 1, liquid hydrogen peroxide is conveyed through conduit 114 and is introduced into transfer conduit 52 at injection tap 56 to inject hydrogen peroxide liquid into the treated fluid entering chamber 36 and thereby chemically remove the ozone residual in the treated water before it leaves contactor 10.

Figure 8:
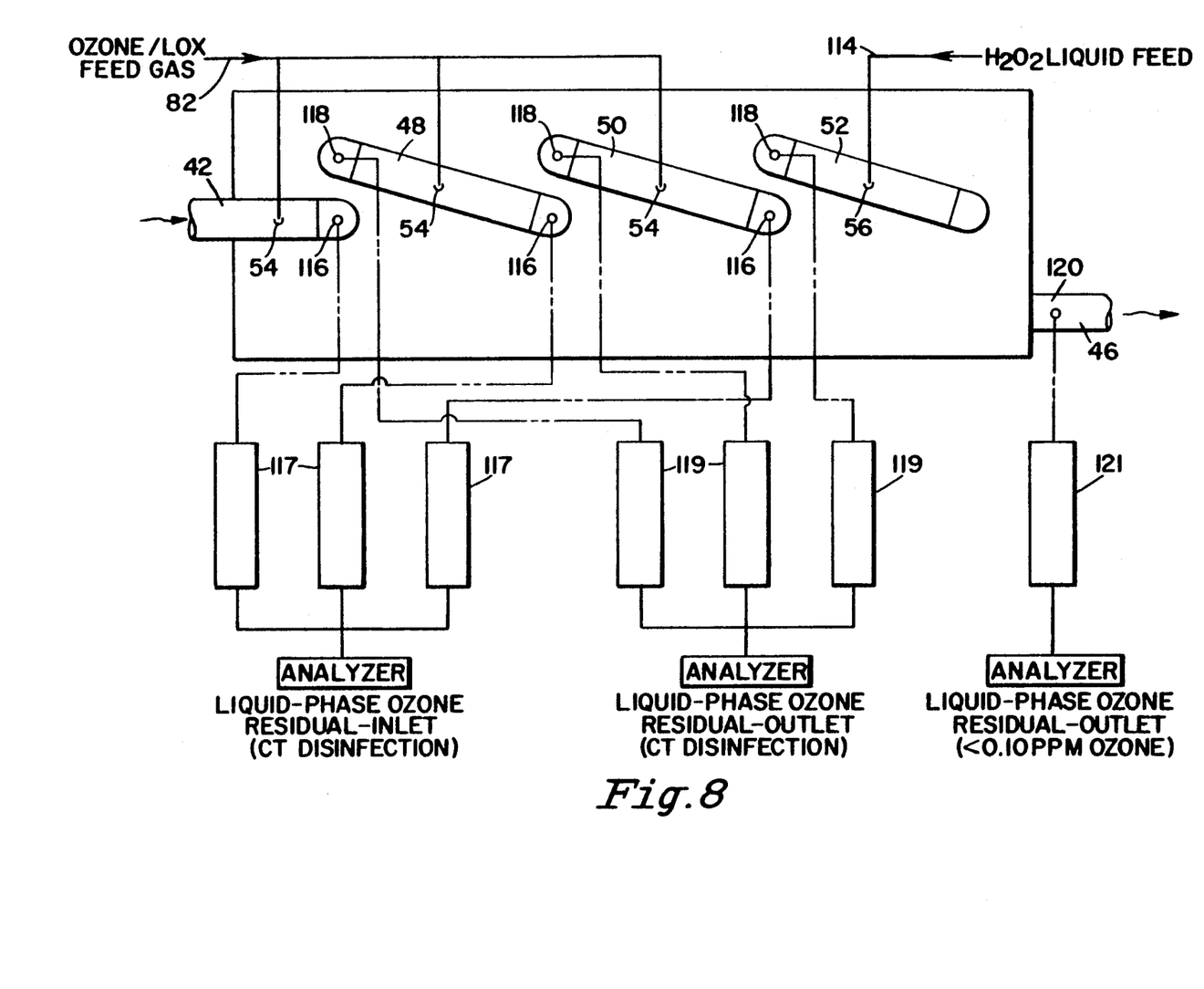
FIG. 8 is a diagrammatic view of a water analysis system for use with apparatus in accordance with the present invention.

As shown in FIG. 8, a sampling and monitoring arrangement is provided for assessing the efficiency of operation of the treatment system in accordance with regulatory requirements for potable water disinfection, both for individual chambers as well as for the overall system. The sampling system includes inlet sampling taps 116 in inlet conduit 42 and in each of the outlet portions of transfer conduits 48 and 50, for withdrawing water samples from the inlets to each of treatment chambers 30, 32, and 34 to respective sampling chambers 117, to permit monitoring of the ozone concentrations of the water at the inlet points to each of chambers 30, 32, and 34. Similarly, outlet sampling taps 118 are provided in each of the inlet portions of transfer conduits 48, 50, and 52 for withdrawing water samples from the outlets from each of treatment chambers 30, 32, and 34 to respective sampling chambers 119, to permit monitoring of the ozone concentrations of the water at the outlet points from each of chambers 30, 32, and 34.

Alternatively, an outlet sampling tap can be provided near the bottom of drop pipe 66, if it is desired to collect a sample after the sidestream and main flows have thoroughly blended in mixing section 74. Consequently, the residual ozone concentration for any chamber can be determined, in order to permit an assessment of the efficiency of the disinfection at each step of the process.

An additional sample tap 120 is provided in outlet conduit 46 for withdrawing water from the outlet from endmost chamber 36 to sampling chamber 121, to permit the determination of the amount of any residual ozone that remains in the treated water after the addition of hydrogen peroxide in treatment chamber 36.

In addition to the sampling tap locations shown in FIG. 8, sampling taps can alternatively be provided upstream and downstream of ozone injection taps 54 (see FIG. 1) in the transfer conduits, and downstream of mixing sections 74 in the respective drop pipes 66 (see FIG. 7).

Figure 9:
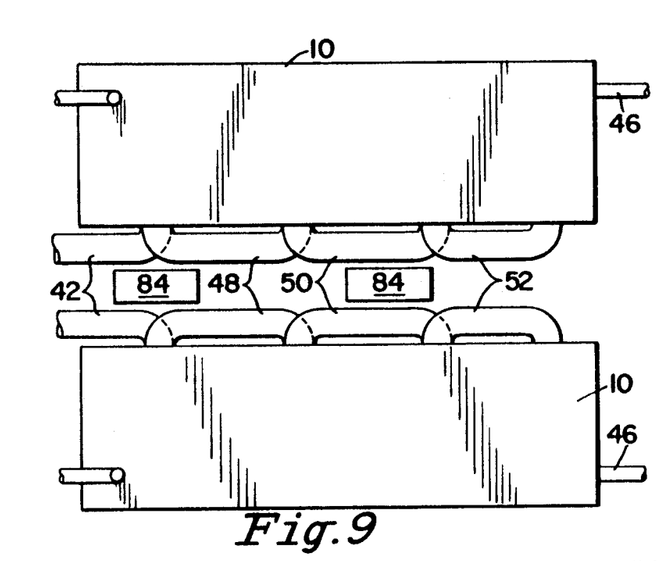
FIG. 9 is a top plan view of a pair of water treatment systems in accordance with the present invention.

If desired, and depending upon the volume of water to be treated, a plurality of contactor vessels 10 can be arranged to provide a bank of vessels in side-by-side relationship, as illustrated in the plan view of FIG. 9. As shown, the external piping and associated ozonation and sampling apparatus can be positioned between the treatment cells in order to minimize space requirements.

Another embodiment of the present invention makes use of the multiple treatment chamber ozone contactor vessel 10 as shown in FIG. 1, except that instead of utilizing the sidestream injection of ozonated water the alternative embodiment utilizes direct diffusion of ozone into water flowing within transfer conduits 48, 50, and 52. Referring to FIGS. 10 through 14, there are shown several embodiments of porous, rod-type bubble diffusers.

Figure 10:
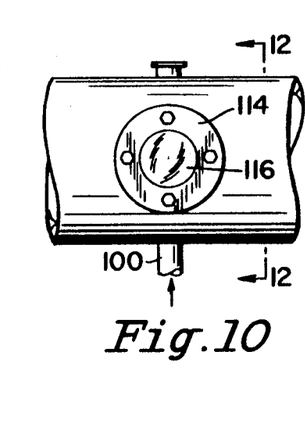
FIG. 10 is a fragmentary side view showing an alternative structure for adding ozone gas to a sidestream water flow, wherein ozone gas is injected directly into the water through ceramic, rod-type diffusers positioned within the transfer conduits.
Figure 11:
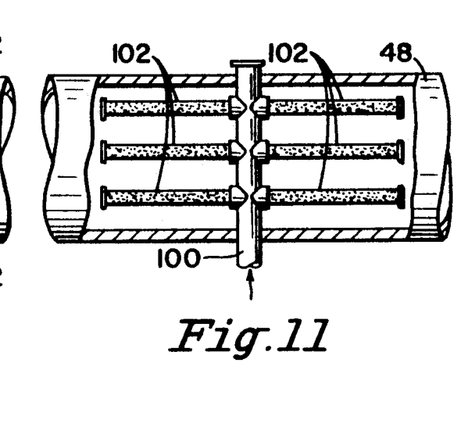
FIG. 11 is a fragmentary side view, partially broken away, showing the diffuser arrangement within the transfer conduit for the structure shown in FIG. 10.
Figure 12:
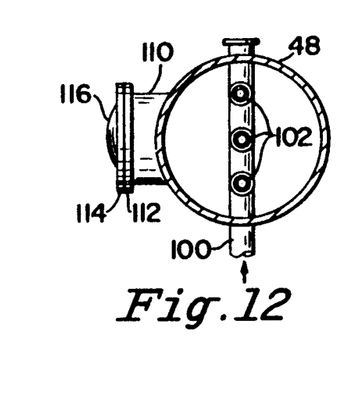
FIG. 12 is a cross-sectional view taken along the line 12—12 of FIG. 10.

FIG. 10 shows a fragmentary portion of transfer conduit 48, to illustrate the structural arrangement. Extending transversely into and within conduit 48 is an ozone distribution conduit 100, which communicates with a source of gaseous ozone (not shown), which can be, for example, an ozone generator such as generator 84 shown in FIG. 1. Extending from distribution conduit 100 in the axial direction of transfer conduit 48, and substantially aligned with the direction of flow of water through transfer conduit 48, are a plurality of fine-bubble, porous, ceramic rod diffusers 102 (see FIGS. 11 and 12), which are adapted to discharge a large number of small diameter (approximately 2 to 3 mm.) bubbles of ozone into the water flowing within transfer conduit 48, to achieve the desired mass transfer of ozone into water to be treated. For this embodiment, the number and axial length of the rod-type diffusers can be varied to accommodate the design ozone flow rate.

Figure 13:
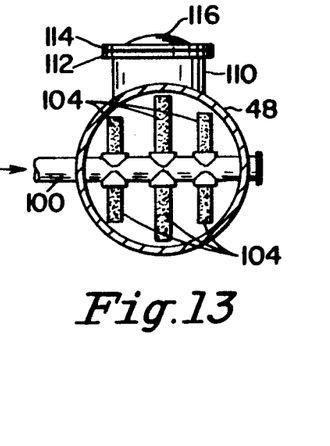
FIG. 13 is a cross-sectional view similar to FIG. 12, but showing another structural arrangement of rod-type diffusers within a transfer conduit.

Another embodiment of the ceramic, porous, rod-type diffuser arrangement is shown in FIG. 13, in which a plurality of rod-type diffusers 104 extend outwardly in opposite directions from distribution conduit 100, again with the diffuser longitudinal axes substantially aligned with the direction of flow of water within transfer conduit 48. As shown, the axes of the respective diffusers each lie in a plane that extends substantially perpendicular to the longitudinal axis of transfer conduit 48. Although this orientation of the diffusers provides the best distribution of ozone gas across the water flow path, the volumetric output is limited by the diameter of transfer conduit 48.

Figure 14:
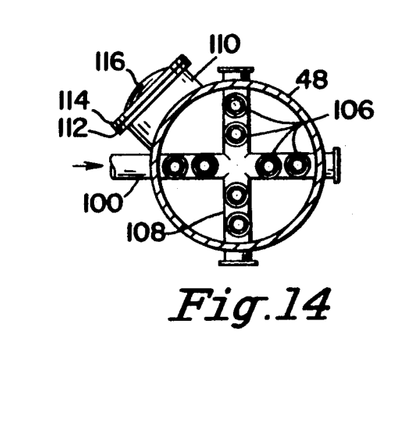
FIG. 14 is a cross-sectional view similar to FIGS. 12 and 13, but showing still another structural arrangement of rod-type diffusers within a transfer conduit.

A further embodiment of the ceramic, porous, rod-type diffuser arrangement is shown in FIG. 14, in which a plurality of rod-type diffusers 106 extend axially, relative to transfer conduit 48, and are arrayed with their respective axes lying in each of two perpendicular planes that extend along and are aligned with the flow direction through the respective conduits, to define a cross pattern with manifold 48 when viewed in a transverse plane passing through transfer conduit 48. A larger number of diffuser elements can be employed using this arrangement, to provide more effective mass transfer of ozone to the water and thereby improved disinfection at higher ozone feed rates.

In each of the embodiments shown in FIGS. 10 through 14 an access handhole 110 is provided, having a flange 112 to which the flange 114 or a glass inspection port 116 can be attached to permit inspection of the ceramic rod diffusers and to provide access for cleaning and repair.

In operation, untreated water is conveyed to contactor 10 through inlet conduit 42 at a flow rate selected to cause all water flows to take place through conduits, rather than spilling over chamber separator walls 24 and 26. The provision of exteriorly-positioned conduits serves to minimize flow short-circuiting, which sometimes occurs when contactor vessels include interiorly-positioned baffle walls of the flow-over or flow-under type.

In the embodiment of FIGS. 1 through 7, treated water from a suitable outside source (not shown) is provided initially to booster pump 96 until treated water is available in outlet conduit 46, which can later be connected with the pump as the source of treated water. In that regard, it is necessary that only treated water be used for the several sidestream flows because the sidestream flow will be fed into several chambers, and therefore unless treated water is used that part of the sidestream flow that does not pass through each chamber will not receive complete disinfection.

Pump 96 provides a high velocity water flow to eductor 92 in order to induce flow into eductor 92 of ozone from ozone generator 84, to provide ozonated water for introduction into streams of water entering the several cells of contactor vessel 10. Static mixer 98 provides additional intermixing of the ozone and water for improved mass transfer and absorption of the ozone in the water.

Flow of the ozonated water into the several cells is controlled by flow control valves 112 downstream of flow distribution manifold 102. After contactor vessel 10 is in full operation under steady-state conditions, the treated water source can be switched to outlet conduit 46 of contactor vessel 10 through tap 120 in outlet conduit 46.

Water to be treated is introduced to contactor vessel 10 through inlet conduit 42. Initially the water fills the several chambers until a steady state flow condition through contactor vessel 10 is achieved. The water level in the contactor vessel is maintained by a control weir, positioned either within the last chamber (if the weir is also used for degasification), or within another treatment unit positioned downstream of the contactor vessel.

When a steady-state flow condition occurs, ozonated water from ozonated water conduit 104 is introduced at injection tap 54 into inlet conduit 42, whereupon the water enters drop conduit 66 within chamber 30. As the water flows through drop conduit 66 its velocity increases in converging section 70, with a consequent drop in pressure. The high velocity, low pressure mixture of untreated water and ozonated water passes through constant area mixing section 74 to provide improved mixing and dispersion of the ozone within the flowing stream.

As the ozone-water mixture exits from constant area mixing section 74 it enters diverging portion 78, wherein the velocity of the water diminishes and the static pressure increases, with the result that any ozone bubbles contained within the flowing stream entering drop chamber 66 are trapped within diverging section 78. As a consequence, water passing through the zone of trapped ozone bubbles is exposed to the ozone bubbles for increased treatment efficiency.

After passing through diverging section 78, the ozone-water mixture flow continues to flare outwardly and along bottom wall 12 of the chamber, for additional mixing with water within the chamber, and then flows upwardly, during which time additional mixing and disinfection occur. Because of the position below the surface of the water within chamber 30 of the inlet to transfer conduit 48, the partially treated water enters transfer conduit 48 and flows downwardly to drop conduit 66 in next chamber 32. As the water flows through transfer conduit 48, additional ozonated water is introduced substantially at the mid-point of transfer conduit 48 through injection tap 54.

Water samples taken from the upstream sample tap 118 in transfer conduit 48 permit an assessment of the outlet residual ozone concentration for first chamber 30. Similarly, downstream sample tap 116 in transfer conduit 48 permits an assessment of the inlet ozone concentration for the second chamber 32. Alternatively, the sample taps can be provided in the drop pipes. Similar introduction of ozonated water through injection tap 54 in transfer conduit 50, and corresponding sample taps in transfer conduits 50 and 52 permit similar assessments to be made for each of chambers 32 and 34.

Final treatment chamber 36 is provided to permit the addition to the treated water of hydrogen peroxide to promote the formation of hydroxyl radicals for advanced oxidation. The hydrogen peroxide also eliminates any residual ozone from the water within chamber 36, and consequently ozone degasification by passing the treated water over a weir, or the like, is not required, and therefore head loss can be minimized. However, the use of a weir drop (see FIGS. 1, 4, 5, and 6) is an alternative for degasifying the ozone.

The drop chamber structure disclosed provides significantly improved ozonation in that additional turbulent mixing is promoted within the drop chamber, and is also promoted within the several treatment chambers by virtue of the mixing provided by the drop chamber discharge flow with the water within the associated chamber. Mixing also occurs within the transfer conduits by virtue of the jet action of the introduction of the ozonated water into the respective flowing streams.

The structures shown in FIGS. 10 through 14 operate in a similar manner to effect disinfection. Additionally, they provide a simpler structural arrangement for the introduction of ozone gas because booster pump 96, eductor 92, and static mixer 98, which are included in the contactor apparatus shown in FIG. 1, are not required. As a result, the pressure drop that accompanies use of a static mixer is not encountered, less energy is required to operate the system, and better mass transfer is obtained at higher gas feed rates, because the gas-to-liquid ratio is much smaller when ozone is introduced in the main water flow stream, as opposed to its introduction via a sidestream flow.

Figures 15, 22:
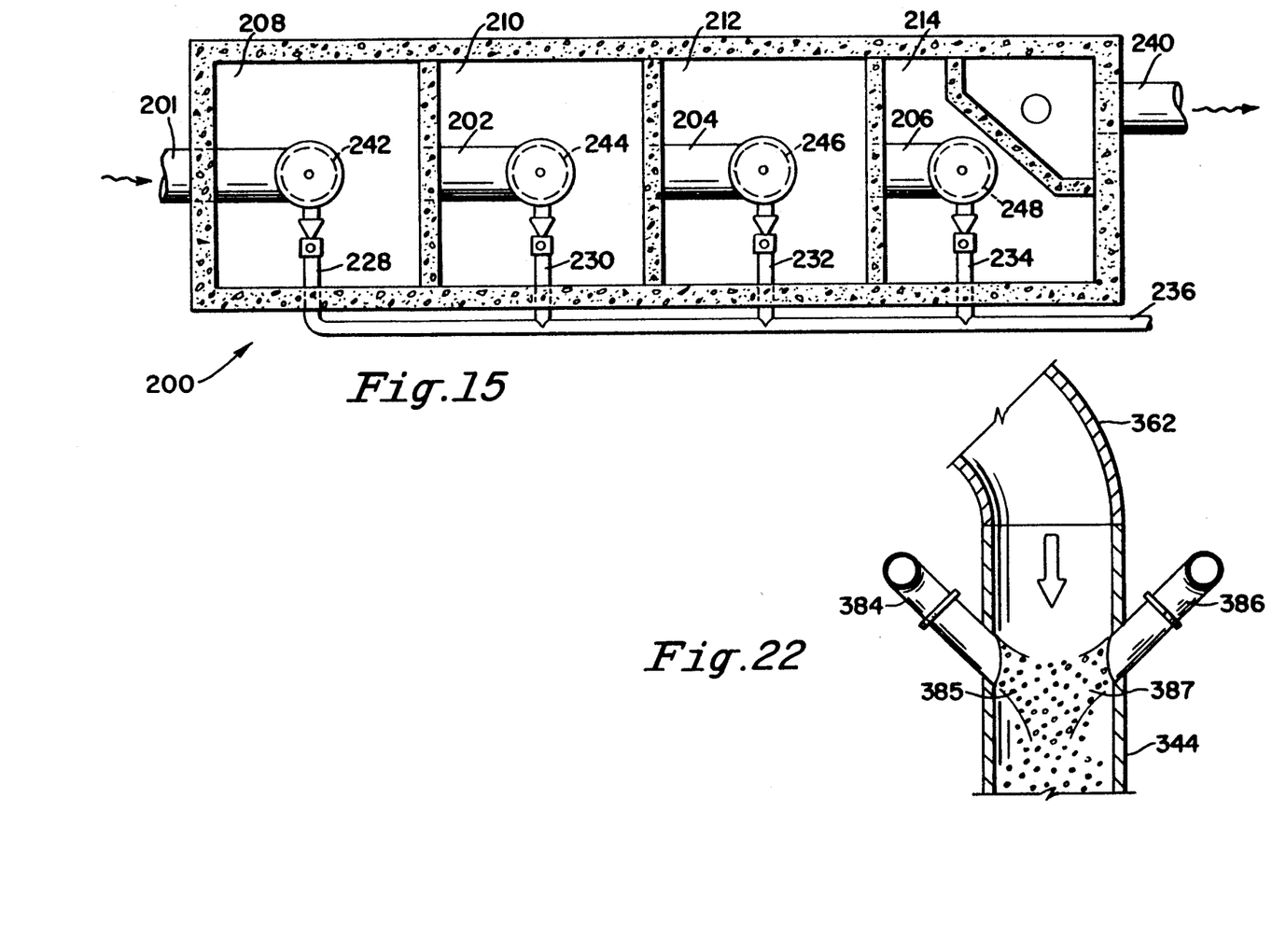
FIG. 15 is a top plan view of a another embodiment of ozone injection water treatment apparatus in accordance with the present invention.
FIG. 22 is an enlarged, fragmentary view showing the water and sidestream flow at the ozone introduction point for the embodiment shown in FIG. 19.
Figure 16:
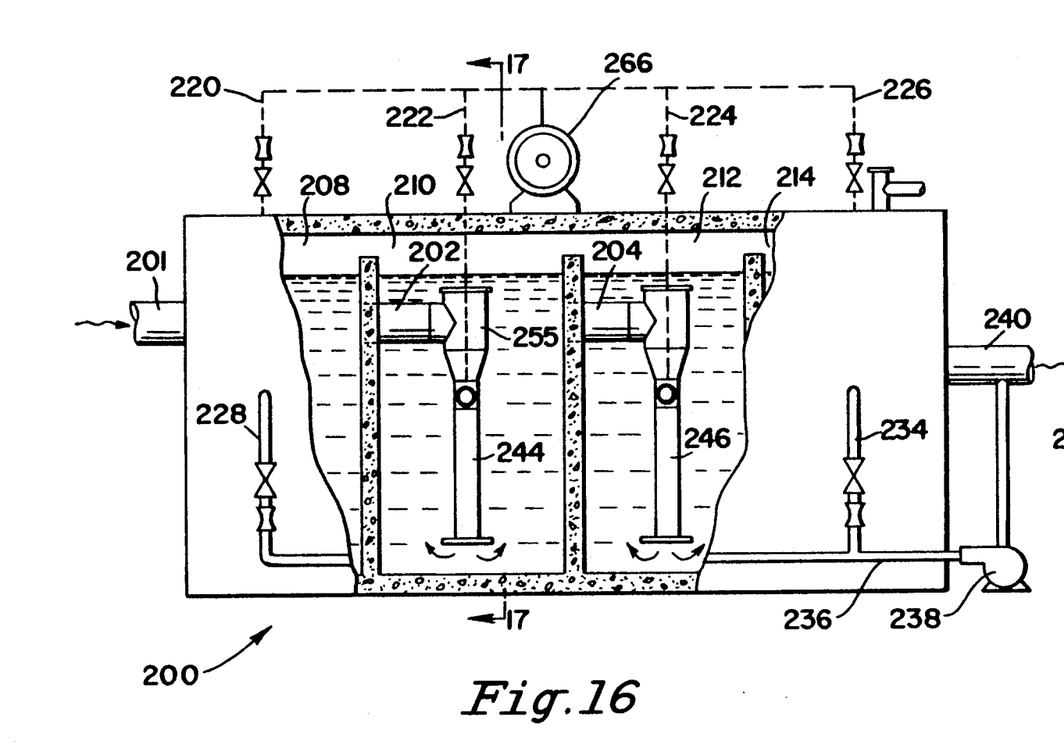
FIG. 16 is a side elevational view, partially broken away, of the water treatment apparatus shown in FIG. 15.
Figure 17:
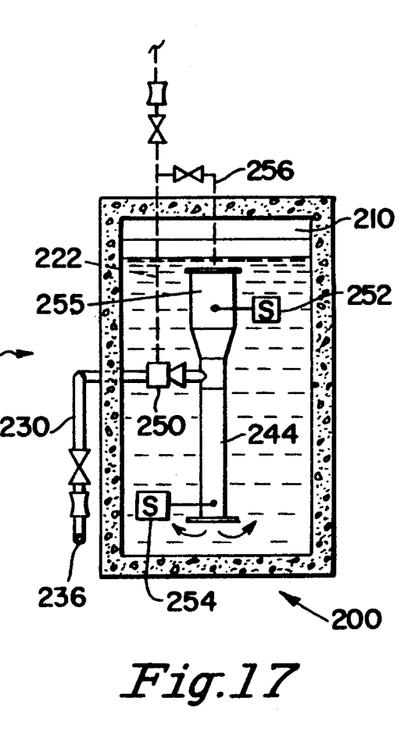
FIG. 17 is a transverse cross-sectional view taken along the line 17—17 of FIG. 16.

Another embodiment of ozone sidestream disinfection apparatus is shown in FIGS. 15, 16, and 17. Instead of the positioning externally of vessel 10 of fluid transfer conduits 48, 50, and 52 that extend between adjacent treatment chambers, as in the first embodiment shown in FIGS. 1, 4, 5, and 6, the FIG. 15 embodiment incorporates a vessel 210 that includes an inlet conduit 211 and internal transfer conduits 212, 214, and 216 to provide communication between adjacent chambers and to permit the transfer of fluid to be treated from one chamber to the adjacent chamber. Thus, conduit 212 extends horizontally from chamber 219 into chamber 221, conduit 214 extends horizontally from chamber 221 into chamber 222, and conduit 216 extends horizontally from chamber 222 to chamber 224. Each of the transfer conduits is positioned so that its outlet opening into a respective chamber is submerged below the surface of the water within the chamber.

Another difference between the FIG. 1 and FIG. 15 embodiments is the point at which the ozone is introduced into the sidestream flow. In the FIG. 15 embodiment, an ultra-high concentration ozone generator 226 (see FIG. 16) is positioned on the top wall 228 of vessel 210. Separate ozone conduits 221, 222, 224, and 226 extend from ozone generator 226 to communicate with sidestream flow conduits 228, 230, 232, and 234, respectively. A sidestream header 236 extends from a sidestream booster pump 238 and provides a sidestream flow of treated water from vessel outlet 240 to the respective sidestream flow conduits.

Sidestream flow conduits 228, 230, 232, and 234 communicate with respective drop conduits 242, 244, 246, and 248 to introduce ozonated sidestream flow into downwardly flowing, partially treated water before the water enters each of the respective chambers of vessel 210 from the transfer conduits. The smaller diameters of each of the drop conduits, relative to the diameters of the respective transfer conduits with which the drop conduits communicate, imparts a higher velocity to the incoming water, and it is in the higher velocity region of the drop conduits that the ozonated flows enter the respective drop conduits to intermix with the water to be treated.

Figure 18:
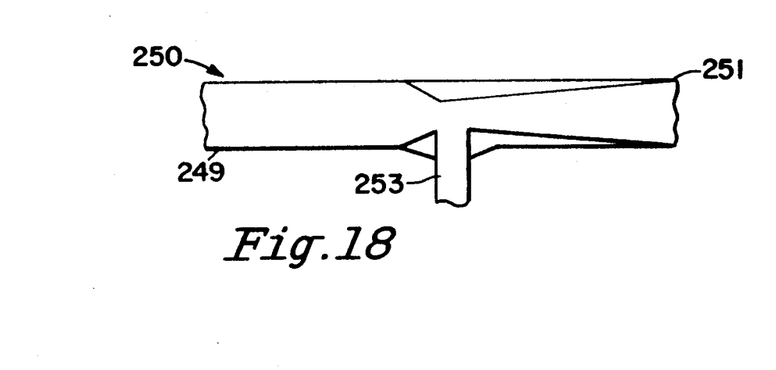
FIG. 18 is an enlarged, longitudinal, cross-sectional view of one form of venturi injector that can be employed to add ozone to the sidestream water flow.

The ozone is introduced into the sidestream flow through the respective ozone flow conduits at a high efficiency venturi injector 250, one form of structure of which is illustrated in FIG. 18. Injector 250 includes a water inlet 249, a water outlet 251, and a gas inlet 253. One source for such a venturi injector is the Mazzei Injector Corporation, of Bakersfield, Calif. The structure and operation of the Mazzei injector is illustrated and described in U.S. Pat. No. 4,123,800, which issued on Oct. 31, 1978, to Angelo L. Mazzei, the disclosure of which is hereby incorporated by reference to the same extent as if fully set forth herein.

The depth below the water surface of the point at which the ozone gas is introduced into the venturi injector has a significant effect on the capacity of the injector. In that regard, it has been found that positioning the venturi injector at relatively shallow depths below the surface of the water to be treated, preferably at depths of less than about ten feet, substantially increases the capacity of the injector to introduce ozone gas, as compared with ozone gas introduction at a greater depth below the water surface, such as 25 feet or so, which is the approximate depth at which ozone introduction frequently occurs in prior art ozone contactors.

As best seen in FIG. 17, which is a cross-sectional view that shows structure that is typical of the several treatment chambers, drop conduit 244 includes sample taps 252 and 254, which are so positioned to permit monitoring of the outlet ozone concentration from the preceding treatment chamber, and the inlet ozone concentration for the succeeding treatment chamber, respectively. The average of the inlet and outlet ozone concentrations for a given treatment chamber is used to calculate the average ozone concentration in the chamber. The sum of the average ozone concentrations in each treatment chamber is used to calculate CT (concentration×time) values for monitoring disinfection efficiency.

As also shown in FIG. 17, a tee pipe segment 255 is positioned at the top of drop pipe 244 to provide a gas collection reservoir for accumulating the gas bubbles in the uppermost portion of the tee. A bleed line 256 emanates from the upwardly extending leg of tee pipe segment 255, which defines the gas collection reservoir at the top of drop conduit 244, to recover and to recirculate into conduit 222, and subsequently into venturi injector 250, any ozone gas that is liberated from the flow entering the treatment chamber and that would otherwise collect at the top of the drop pipe.

The FIG. 17 embodiment of the contactor apparatus, because of the high efficiency venturi injectors, provides improved, more efficient mixing of the ozone with the sidestream flow, and of the sidestream flow with the main flow in the drop pipe, leading to mass transfer rates greater than 95%. Additionally, the disclosed arrangement permits the sidestream flow rate to be maintained constant, independent of the flow rate of water being treated, and therefore the apparatus can be designed to treat a wide range of treatment flows and ozone doses without compromising mixing efficiency. In the fine bubble diffuser-type apparatus, on the other hand, gas-liquid mixing, which occurs at the diffuser outlets, is dependent on the ozone gas flow rate, and consequently one or more chambers of the apparatus must often be shut down to maintain adequate mixing at lower treatment flow rates, especially if high concentration ozone feed gas (5 to 10%) is used.

Figure 19:
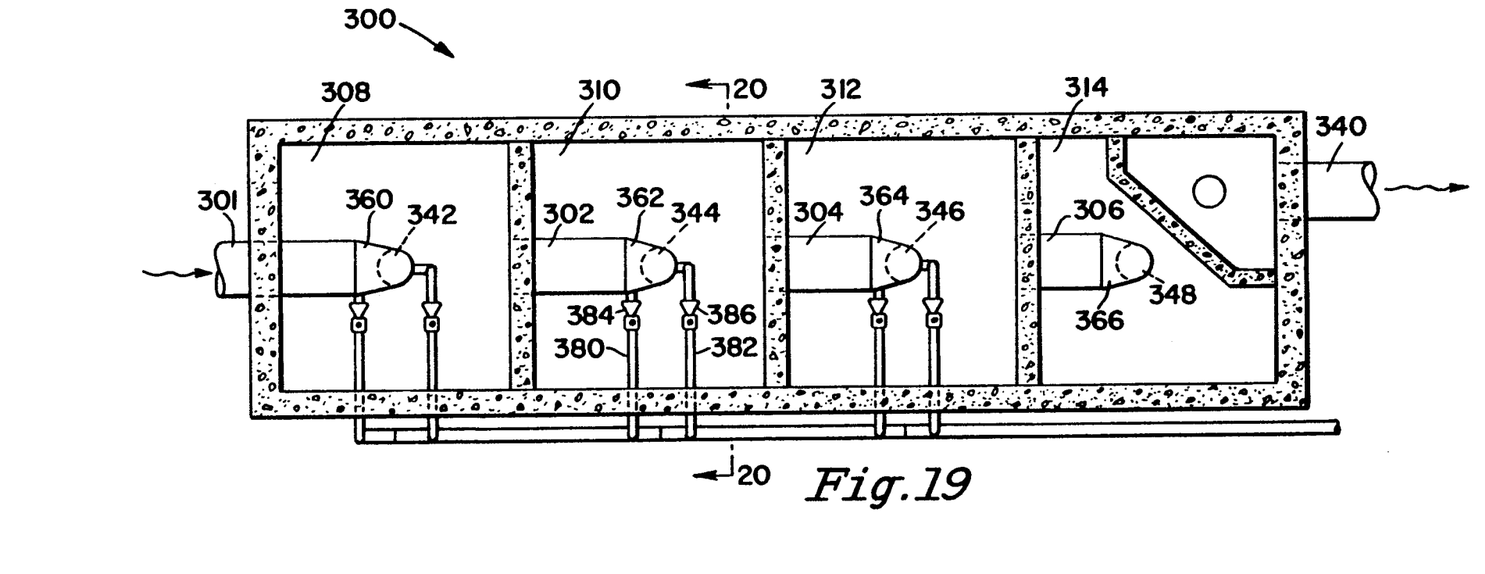
FIG. 19 is a top plan view of a further embodiment of ozone injection water treatment apparatus in accordance with the present invention.
Figure 20:
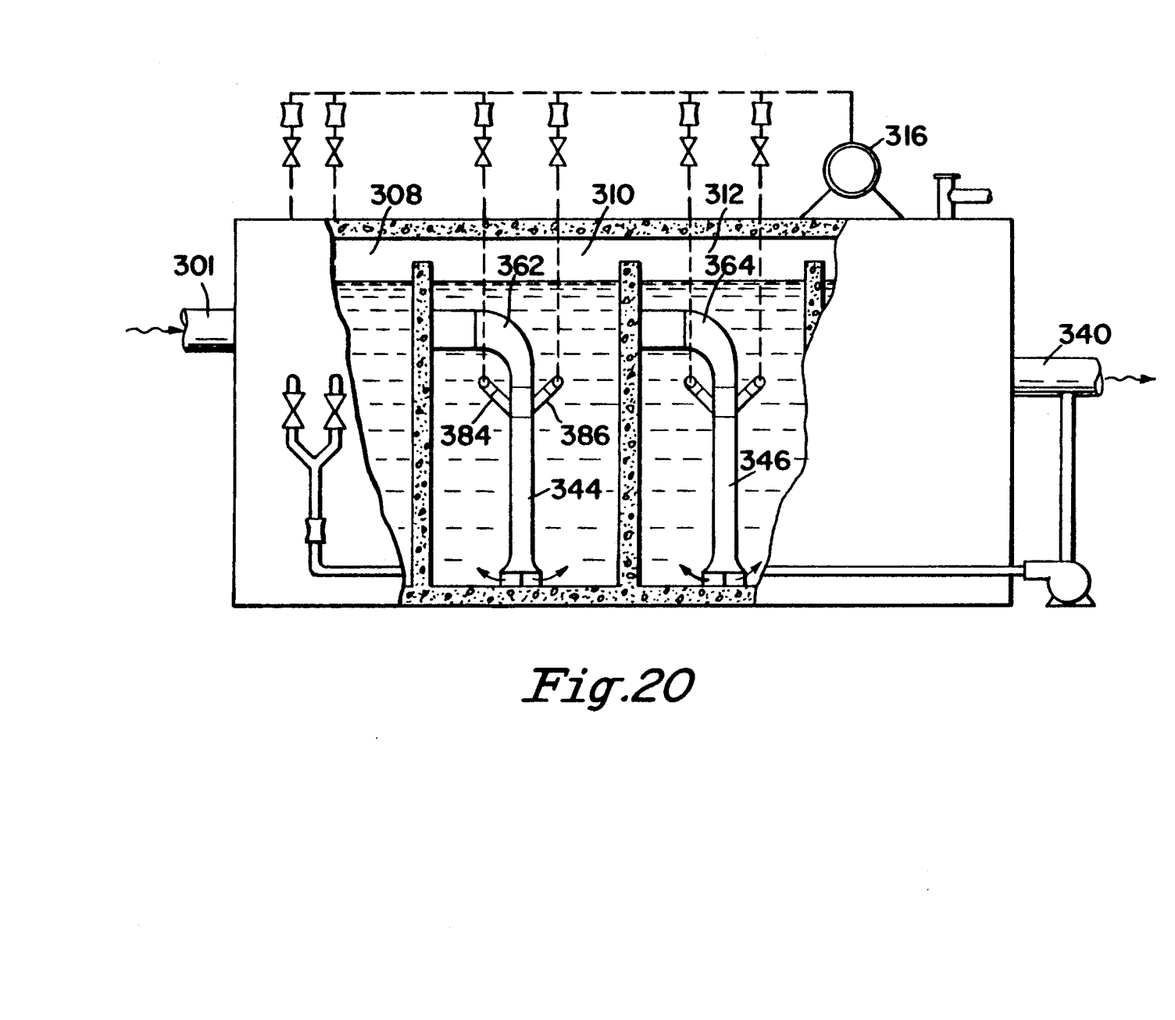
FIG. 20 is a side elevational view, partially broken away, of the water treatment apparatus shown in FIG. 19.

Referring now to another embodiment of the present invention, shown in FIGS. 19 through 22, similar parts are identified with similar reference numerals as in the embodiment shown in FIGS. 15 through 17, except that the first numeral for parts of the FIG. 17 embodiment begin with the numeral "2," whereas the corresponding parts for the FIG. 19 embodiment begin with the numeral "3." One of the differences in the latter embodiment is the provision between transfer conduits 302, 304, and 306, and drop conduits 342, 344, 346, and 348 of respective reducing elbows 360, 362, 364, and 366. The reducing elbows permit a smoother flow transition, with less pressure loss, between the horizontally disposed transfer conduits and the vertically disposed drop conduits, although no "reservoir" is provided for accumulating gases that migrate to the top of the drop pipe.

In addition to the reducing elbows, the FIG. 19 embodiment also includes two sidestream injection conduits that feed a single drop conduit. As best seen in FIG. 19, and referring to chamber 310, a pair of sidestream flow conduits 380, 382 branch from sidestream flow header 336 to communicate with drop conduit 344. A high efficiency venturi injector 384, 386 is positioned in each of sidestream flow conduits 380, 382, respectively, to permit the introduction of ozone to each of the contactors. As in the preceding embodiments, the ozone is preferably generated from ultra-high concentration ozone generator 316, in order to reduce the volumetric gas flow rate delivered to the injectors.

Figure 21:
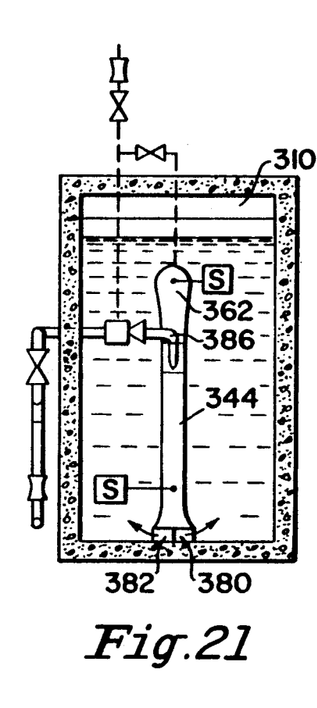
FIG. 21 is a transverse cross-sectional view taken along the line 21—21 of FIG. 20.

An additional difference reflected in the FIG. 19 embodiment is a flared outlet at the lower end of each of the drop conduits. Referring to FIG. 21, drop conduit 344 includes an outlet 380 that has a plurality of flow diverting vanes 382 to change the direction of flow of treated water within drop conduit 346 from a vertically downward direction to horizontally outward to distribute the treated water substantially uniformly across the bottom of chamber 310. Similar flared outlets are provided at the ends of the drop conduits in chambers 308, 312, and 314.

Improved intermixing of the ozone-containing sidestream flows with the flow within the respective drop conduits of water to be treated is obtained by orienting the sidestream flow conduits so that their axes define about a 45° angle with the vertical, with the sidestream flow conduits disposed so that flow proceeds therethrough in a downward direction. Referring to FIG. 22, the sidestream flows 385 and 387 are shown issuing into drop conduit 344 opposite from and toward each other, to intermix with each other and simultaneously to entrain the inlet flow passing downwardly from elbow 362. As a result, greater turbulence is created within the drop conduit, thereby improving mixing and consequent ozone treatment of the drop conduit flows. Moreover, ozone bubbles are entrained within the downward flow in the drop conduit, and are carried through the bottom of the drop conduit and into the surrounding water within the chamber for additional intermixing with water within the chamber. Consequently, the disclosed arrangement permits a wider range of ozone gas flows, and it permits use of only one of the sidestream flows under low treatment flow conditions, and both sidestream flows under high treatment flow conditions.

It will thus be appreciated that the present invention provides distinct advantages over the previously-employed ozone injection disinfection systems in that the present invention provides greater gas-to-liquid mass transfer, thereby providing more complete disinfection in a compact area. At the same time, the provision of liquid hydrogen peroxide for final degasification of the treated water eliminates the head loss that would occur with weirs and other types of degasification techniques. Finally, the individually controllable ozonated water introduction conduits and the sampling and monitoring system permit close control to be maintained over the entire process, and the use of multiple contact chambers provides sufficient contact time for disinfection and the sequential addition of ozone to each chamber to allow the ozone dose to be matched with the ozone demand of the water, and the ozone demand will decrease as the water is treated in each successive chamber.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Apparatus for disinfecting water by ozone injection, said apparatus comprising:
   a) a plurality of discrete water treatment chambers for receiving and containing water to be treated, including at least a first, inflow chamber and a last, outflow chamber, a water inlet conduit communicating with the inflow chamber for conveying into the inflow chamber untreated water to be disinfected, and a water outlet conduit communicating with the outflow chamber for conveying from the outflow chamber treated water that has been disinfected by exposure to ozone;
   b) a plurality of transfer conduits each extending between and interconnecting respective adjacent treatment chambers to define a series connection of the respective treatment chambers so that water to be treated flows from the inlet conduit into the inflow chamber and through the respective transfer conduits and sequentially through each successive treatment chamber to the outlet conduit;
   c) a drop conduit extending substantially vertically within each chamber, each of the drop conduits communicating with a respective one of the transfer conduits to receive water passing through the transfer conduit from an adjacent chamber and having a discharge opening adjacent a base of the chamber within which the drop conduit is positioned; and
   d) ozone distribution conduits adapted to be in communication with a source of ozone for disinfection of the water, the distribution conduits positioned to introduce ozone into water to be treated as the water flows into a respective chamber for introducing ozone into the water to be treated at multiple points within the apparatus to provide sequential treatment of the water and multiple exposures of the water to ozone for disinfection.

2. Apparatus in accordance with claim 1 including:
   a) an ozone mixer for introducing ozone gas into a sidestream of disinfected water, to provide a source of ozonated sidestream water for injection into water to be treated; and
   b) a distribution manifold communicating with the ozone mixer for receiving the ozonated sidestream water, wherein the respective distribution conduits are each in communication with the distribution manifold to distribute ozonated sidestream water to the inlet and transfer conduits.

3. Apparatus as claimed in claim 1, wherein the inlet conduit and the at least one transfer conduit each extend into the interior of an associated treatment chamber and each include a drop conduit that has a flow outlet that terminates adjacent a bottom wall in the respective treatment chambers to discharge water adjacent the bottom wall.

4. Apparatus as claimed in claim 3, wherein the drop conduits each include a mixing chamber through which the water to be treated flows, the mixing chamber providing blending of sidestream and main flows before discharge into a respective treatment chamber.

5. Apparatus as claimed in claim 4, wherein each mixing chamber includes a converging section and a diverging section to alternately accelerate and decelerate the flow velocity of water flowing through the mixing chamber and to trap ozone gas bubbles within the mixing chamber for additional contact of the ozone with water, to provide improved mixing and dispersion of ozone within the water for improved efficiency of disinfection.

6. Apparatus in accordance with claim 5, wherein the mixing chamber includes a constant area section positioned between the converging section and the diverging section for providing an intermediate zone within which ozone bubbles can be trapped for additional exposure time of water to ozone gas.

7. Apparatus in accordance with claim 2, wherein the ozone mixer includes an eductor in communication with a source of disinfected water and with a source of ozone, for mixing the water and ozone together within the eductor to provide a sidestream flow of ozonated water.

8. Apparatus in accordance with claim 2, including a static mixer positioned downstream of the eductor for providing additional intermixing and mass transfer of the ozone to the sidestream water.

9. Apparatus in accordance with claim 1, wherein the distribution conduits each include a flowmeter to measure the respective sidestream flows to the respective treatment chambers.

10. Apparatus in accordance with claim 9, wherein the distribution conduits each include a flow control valve to control the volume of each sidestream flow into the inlet conduit and the respective transfer conduits.

11. Apparatus in accordance with claim 1, wherein each transfer conduit includes an ozone introduction tap in communication with a respective distribution conduit for introducing ozone into the interior of the transfer conduit for mixing with water passing through the transfer conduit.

12. Apparatus in accordance with claim 1, wherein the transfer conduits are inclined relative to a horizontal plane so that their respective water inlets to the respective treatment chambers are positioned directly below respective water outlets from the respective treatment chambers so that the entire depth of each of the respective treatment chambers can be used for ozone contacting.

13. Apparatus in accordance with claim 2, including an ozone generator for providing a source of ozone to the ozone mixer, the ozone generator adapted to communicate with a source of liquid oxygen.

14. Apparatus in accordance with claim 13, wherein the ozone generator includes a source of liquid oxygen to produce a high ozone concentration.

15. Apparatus in accordance with claim 1, wherein sampling taps are provided to obtain samples of water at an inlet and at an outlet to a treatment chamber to monitor ozone concentration in water at the inlet and outlet of the chamber.

16. Apparatus in accordance with claim 1, wherein an endmost treatment chamber includes an injection tap for injecting hydrogen peroxide into water within the endmost treatment chamber to eliminate residual ozone in the water.

17. Apparatus as claimed in claim 1, including a plurality of porous diffuser elements that extend within respective inlet and transfer conduits, and wherein the distribution conduits communicate with respective diffuser elements to introduce gaseous ozone directly into water flowing within the respective inlet and transfer conduits.

18. Apparatus as claimed in claim 17 wherein the porous diffuser elements are elongated, rod-shaped structures.

19. Apparatus as claimed in claim 18 wherein the porous diffuser elements extend axially of the respective conduits within which the respective diffuser elements are positioned and wherein the diffuser elements have their major dimension substantially aligned with the direction of flow of water within the respective conduits.

20. Apparatus as claimed in claim 18 wherein the porous diffuser elements extend transversely relative to the direction of flow within the respective conduits.

21. Apparatus as claimed in claim 18 wherein the porous diffuser elements have longitudinal axes that lie in each of two substantially perpendicular planes that are aligned with the flow direction within a respective flow conduit, to define a cross pattern to expose additional diffuser element surface area to flow of water within the respective conduits and provide improved gas-to-water mass transfer.

22. Apparatus a claimed in claim 18 wherein the respective transfer and distribution conduits include a viewing port adjacent the porous diffuser elements to permit visual inspection of the elements while within the respective conduits.

23. Apparatus as claimed in claim 22 wherein the viewing port is removable to provide access to the respective diffuser elements.

24. Apparatus in accordance with claim 1, including a venturi injector communicating with a source of disinfected water and with an ozone distribution conduit for introducing ozone gas into a sidestream flow of disinfected water to provide a source of ozonated sidestream water for injection into water to be treated.

25. Apparatus in accordance with claim 24, wherein a pair of venturi injectors and a pair of ozone distribution conduits are provided for each treatment chamber for controlling the flow of ozonated water into a respective treatment chamber.

26. Apparatus in accordance with claim 25 wherein the ozone distribution conduits communicate with a respective drop conduit on opposite sides of the drop conduit to cause the respective incoming sidestream flows entering a drop conduit to impinge upon each other for improved mixing.

27. Apparatus in accordance with claim 26 wherein the ozone distribution conduits are inclined relative to the longitudinal axis of the drop conduit to define an acute angle with the direction of flow within the drop conduit.

28. Apparatus in accordance with claim 1, wherein each transfer conduit is positioned within a respective treatment chamber.

29. Apparatus in accordance with claim 28, wherein the drop conduit includes an ozone gas reservoir for collecting liberated ozone gas for recirculation to an ozone distribution conduit.

30. A method for treating water with ozone for disinfection, said method comprising:
 a) providing a plurality of treatment chambers interconnected to permit sequential flow from one treatment chamber to a next treatment chamber of water to be treated;
 b) introducing water to be treated for disinfection into a first treatment chamber;
 c) providing a source of ozone;
 d) introducing the ozone into the inlet conduit for mixing with the water to be treated;
 e) introducing ozone into respective transfer conduits extending between and interconnecting respective treatment chambers for increased exposure to ozone of water to be disinfected; and
 f) withdrawing treated water from a final treatment chamber.

31. A method in accordance with claim 30, including the step of introducing hydrogen peroxide into water entering the final treatment chamber to eliminate residual ozone in the water before withdrawal.

32. A method in accordance with claim 30, including the step of alternately accelerating and decelerating the flow of water entering each treatment vessel to trap ozone gas bubbles and provide additional time for contact between the ozone bubbles and water to be treated.

33. A method in accordance with claim 30 wherein before introduction into the respective conduits the ozone is injected into a sidestream flow of disinfected water to provide a sidestream flow of ozonated water for introduction into the respective conduits.

34. A method in accordance with claim 30 wherein the ozone is introduced directly into the respective conduits in gaseous form.

35. A method in accordance with claim 34 wherein the ozone is introduced through respective porous diffuser elements positioned within the respective inlet and transfer conduits.

* * * * *